Figure 1:
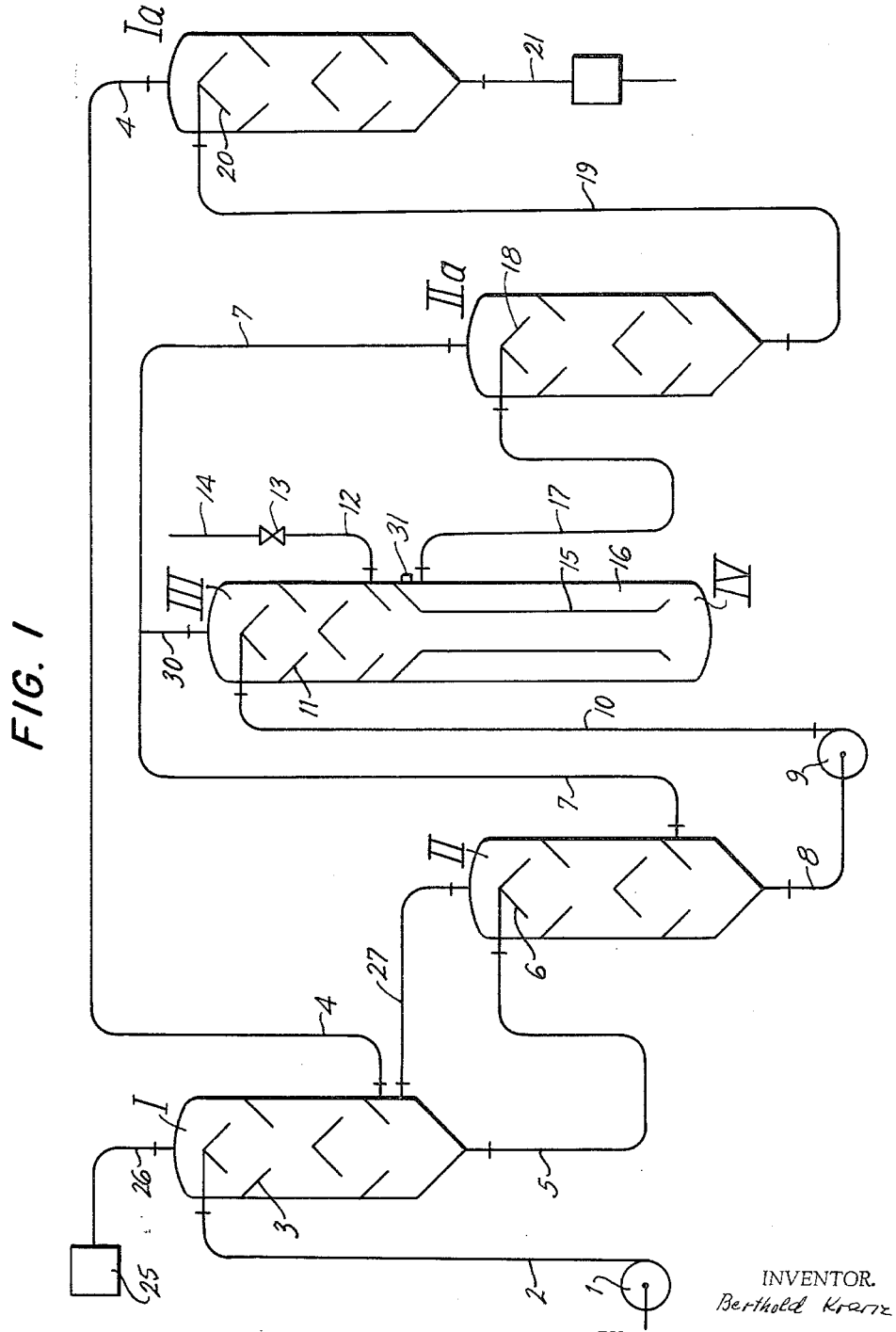

INVENTOR.
Berthold Kranz
BY
Michael J. Striker

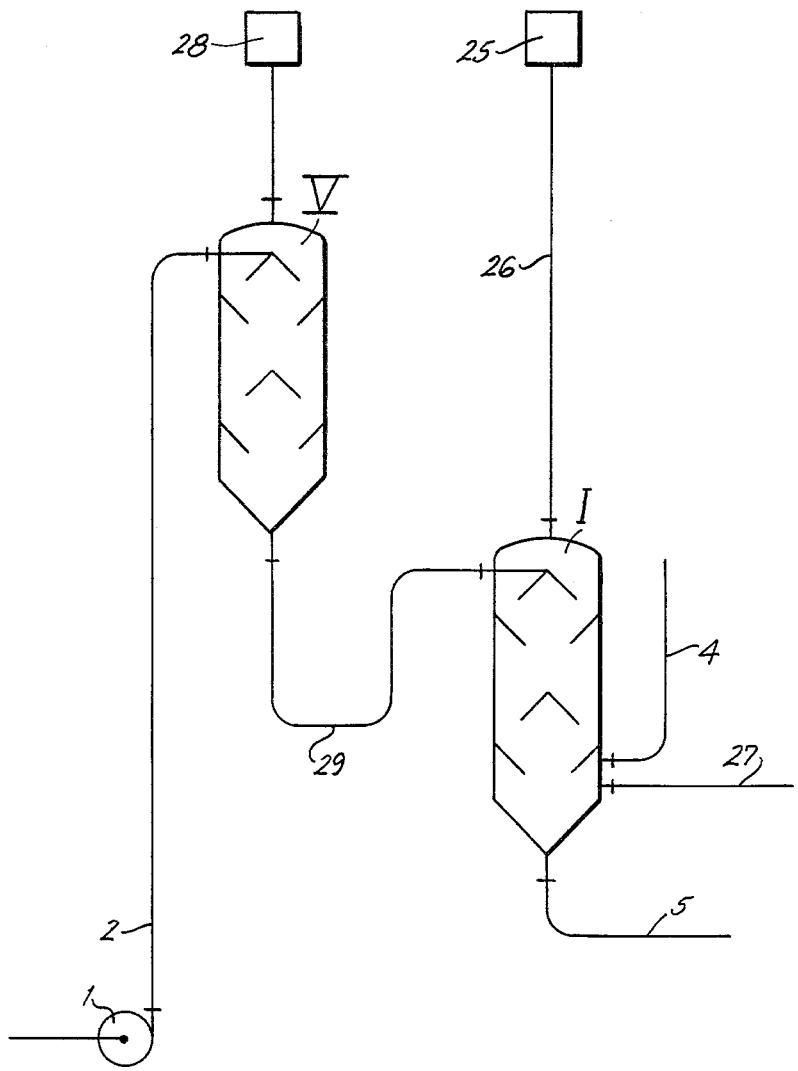

3,219,579
METHOD AND ARRANGEMENT FOR TREATING
FLOWABLE WASTE MATERIAL
Berthold Kranz, Roonstrasse 10, Duren,
Rhineland, Germany
Filed Oct. 17, 1963, Ser. No. 316,935
Claims priority, application Germany, Oct. 18, 1962,
C 28,218
12 Claims. (Cl. 210—64)

The present invention to a method and arrangement for treating flowable waste material such as sewage and the like and more particularly is concerned with the heat sterilization of such materials.

The sterilization of waste waters which contain disease causing microorganism, for instance the waste waters derived from hospitals, quarantine stations or biological experimental institutions, conventionally has been carried out by chemical treatment with chlorine or chlorine-developing agents. Recently it has been attempted to avoid the disadvantages of the chlorine treatment by a thermal disinfection or sterilization of such waste waters or infected flowable waste materials.

It has been proposed to comminute the waste liquid including sludge forming foreign materials therein, to heat the thus-formed flowable mixture in a heat exchanger to the sterilization temperature thereof and to maintain the sewage or the like for the required length of time at such elevated sterilization temperature so that the sterilization of the material will be completed.

However, the proposed indirect heating of the raw sewage, waste water or the like by means of heat exchangers is connected with considerable difficulties and disadvantages. If relatively large quantities of flowable material have to be sterilized, a large heat exchange area is required and consequently the heat exchangers will become very large and will represent a very considerable investment. Furthermore, encrustations are formed after some period of use which progressively reduce the effectiveness of the heat exchanger so that the heat exchange surfaces must be frequently cleaned. Consequently, standby equipment is required for operation during cleaning of the regular heat exchangers. This again increases cost and space requirements.

The danger of formation of encrustations and deposits on the heat exchange surfaces is particularly serious if the waste liquid is of a sludge-like consistency, i.e., contains a relatively large proportion of dry substance. Furthermore, for instance in the case of waste waters of high calcium content, lime deposits will accrue on the heat exchange surfaces.

It is therefore an object of the present invention to overcome the above-discussed difficulties and disadvantages.

It is a further object of the present invention to provide an arrangement and a method for sterilizing or disinfecting flowable waste materials such as waste waters, sewage and the like which will permit sterilization of the waste material in a simple and economical manner.

It is yet a further object of the present invention to improve the heat economy of the heat sterilization of such flowable waste materials.

Other objects and advantages of the present invention will become apparent from a further reading of the description and of the appended claims.

With the above and other objects in view, the present invention contemplates a method of treating flowable waste material such as sewage and the like, comprising the steps of passing flowable waste material through a plurality of successively arranged treating stages communicating with each other and including a first group of treating stages for preheating the material, an intermediate stage for heating the material to at least the sterilization temperature thereof, and a second group of treating stages for cooling the thus-sterilized material, the treating stages communicating with each other, introducing steam from an outside source into the intermediate treating stage so as to heat the flowable waste material therein to at least its sterilization temperature; creating a partial vacuum in the first one of said first group of treating stages so as to reduce the pressure in the communicating first and second treating stages, however to a progressively smaller degree in the direction from the first towards the last one of the first group of treating stages and from the last towards the first one of the second group of treating stages, whereby steam will be withdrawn and the flowable waste material will be progressively cooled in the stages of the second group of treating stages due to the reduced pressure maintained therein, introducing the thus-withdrawn steam from the individual stages of the second group of treating stages into the first group of treating stages in such a manner that steam from the last stage of the second group of treating stages is introduced into the first stage of the first group of treating stages and the steam from successive stages of the second group of treating stages taken in the direction from the last towards the first stage of the second group of treating stages will be introduced into successive stages of the first group of treating stages taken in the direction from the first towards the last of the stages of the first group of treating stages thereby preheating the flowable waste material and withdrawing the thus-sterilized and cooled flowable waste material from the last of the second group of treating stages.

Thus, according to the present invention, certain difficulties with respect to the sterilization and disinfection of sewage and the like are overcome by subjecting the heat-sterilized waste water in one or several stages to a partial vacuum, thereby forming water vapors which are then directly introduced into the raw, unsterilized waste water or the like for preheating of the same. Preferably, the water vapors withdrawn from the sterilized sewage will contact the unsterilized sewage in countercurrent flow thereto, whereby for quicker condensation of these water vapors and dilution of the untreated sewage therewith, the mixing of steam and sewage or the like is carried out in treating vessels having located in their respective interiors baffles, such as inclined sheet metal elements, which will force the flowable waste material to form downwardly flowing cascades while the steam will flow upwardly in counter-current thereto, thus assuring quick and intimate mixing of steam and flowable sewage or the like.

Preferably, the preheating of the crude flowable waste material or sewage is carried out under reduced pressure and it is advantageous to precede the preheating of the raw sewage or the like with a degassing of the same which is also carried out under a partial vacuum.

The arrangement of the present invention comprises at least one treating vessel for preheating the sewage or the like, in which steam withdrawn from sterilized sewage (as will be described further below) is introduced into the untreated sewage; an intermediate treating vessel for further heating the preheated sewage or the like to its sterilization temperature by introducing of steam from an outside source directly into the preheated sewage; a further vessel which, however, may also be combined with the intermediate treating vessel, serving for the purpose of maintaining the heated sewage or the like at sterilization temperature for the required length of time so that sterilization will be completed; and a further treating vessel in which the heated sewage or the like is maintained under a partial vacuum so as to form steam under simultaneous cooling or flowable waste material. The thus withdrawn steam is passed into the first treating vessel, mentioned above, for preheating raw sewage or the like therein, while the thus sterilized and cooled sewage or the like may now be safely disposed of, for instance by being passed into a sewer. The last-mentioned treating vessel in which the previously sterilized hot sewage or the like is subjected to a partial vacuum thus represents the steam producer for the steam required in the first treating vessel for preheating the raw sewage. The thermal economy of the arrangement will be improved by providing a group consisting of several successively arranged pretreating or first treating vessels for preheating the raw sewage, and a group of a corresponding number of cooling vessels in which the sterilized sewage or the like is subjected to a partial vacuum under withdrawal of steam therefrom, whereby each of the cooling and steam-producing vessels, respectively, is connected to a different one of the preheating vessels by means of a steam conduit through which the steam from the respective cooling vessel flows into the respective preheating vessel.

It is furthermore preferred, according to the present invention, to connect the preheating vessels and the cooling, steam-producing vessels to one and the same means for providing a partial vacuum, for instance to a vacuum pump.

According to a preferred embodiment of the present invention, the preheating vessels of the plurality or group of preheating vessels on the one hand, and the individual cooling vessels on the other hand, are arranged in vertically staggered relationship and the vessels of each group are connected by siphon conduits the height of which corresponds to the pressure differential between the adjacent treating vessels of the respective group.

As indicated above, it is preferred according to the present invention to arrange the intermediate treating vessel, in which the preheated sewage or the like is heated by direct contact with live steam, joined in a unitary structure together with a vessel providing the space required for holding the thus-heated sewage for the time required to complete sterilization thereof.

According to another preferred embodiment of the present invention, the raw sewage is first degassed before being introduced into the preheating vessel.

Preferably, all or at least some of the treating vessels through which the sewage or the like passes according to the present invention are provided with baffle means such as inclined sheet metal inserts, grids or the like which will serve for forcing the sewage or the like to pass through the respective treating vessel in a cascade-like flow.

Thus, according to the present invention, heat is supplied to the raw sewage or the like in direct manner, i.e. by directly introducing steam into the sewage or the like, and, consequently, without requiring heat exchanger surfaces through which heat could be indirectly supplied to the sewage. Thereby, all of the difficulties and disadvantages which are connected with the formation of encrustations and the deposition of solids on the heat exchanger surfaces are avoided. Furthermore, the entire arrangement becomes more simple and requires less space by withdrawing steam in the second group of treating vessels and directly introducing the thus-withdrawn steam into the crude sewage or the like.

It is also within the scope of the present invention to admix to the raw sewage or the like, prior to introduction of the same into the preheating vessels suitable additives such as polyphosphates, in order to counteract scale formation at any portion of the inner surface of the apparatus which comes in contact with the sewage or the like.

Particularly when the solid content of the raw sewage or the like is high or when the waste water or material which is to be treated is of sludge-like consistency, it is a further advantage of the present invention that the direct introduction of steam during the preheating stages will cause dilution of the raw sewage or the like and will increase the water content thereof. The introduction of the hot steam, which immediately condenses in contact with the sewage, will increase the liquid content thereof and, in addition, will facilitate the heat transfer to the inner portions of the solid constituents of the sewage or the like, whereby the sterilization thereof will be facilitated.

The introduction of steam produced by subjecting the hot sterilized sewage or the like to subatmospheric pressure will also cause a certain degree of degassing of the crude sewage or the like. Since gas bubbles contained in the waste material will have a thermal insulating effect, elimination thereof will improve the heat transfer to all portions of the raw sewage and thus will facilitate complete sterilization of the sewage or the like.

Thus, even in extreme cases with respect to the composition of the sewage or the like, the method and device of the present invention will permit sterilization under advantageous thermal and economic conditions. The arrangement according to the present invention requires relatively little space and can be built at relatively low costs.

Due to the fact that the large heat exchanger surfaces of indirect heat exchange arrangements are not required according to the present invention, the treating vessels may be of relatively simple construction. Preferably, the steam is passed in countercurrent from below against the cascades of raw sewage flowing downwardly through the respective treating vessel. The steam will be condensed and mixed with the raw sewage. Even if encrustations would form on the baffles or inclined guide plates within the preheating vessel, this would not interfere with the heat transfer during direct contact between the steam and the raw sewage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic elevational view of an arrangement according to the present invention in which, by way of example only, two preheating vessels and, correspondingly, two steam-producing cooling vessels are shown; and FIG. 2 is a schematic elevational view of the degassing arrangement showing its connection to the first of the pretreating vessels of FIG. 1.

Referring now to the drawing and particularly to FIG. 1, the flowable waste material, sewage or the like which may have the consistency of a sludge or which might be more fluid, is pumped through pump 1 and conduit 2 into preheating or first treating vessel I. In the interior of treating vessel I, inclined metal sheets are arranged to cause the flowable waste material which has been introduced near the top of the vessel to flow downwardly in a cascade-like fashion. Through conduit 4, in countercurrent to the cascades of sewage or the like, steam produced by reducing the pressure of heated and sterilized waste material is blown into the lower portion of treating vessel I. The thus introduced steam flows upwardly in countercurrent to the downwardly flowing waste material and is condensed, thereby diluting the waste material.

The mixture of steam condensate and untreated raw sewage or the like which has been preheated by taking up the steam from conduit 4, leaves treating vessel I through siphon-shaped conduit 5 and is introduced into preheating or treating vessel II, near the top thereof. In the interior of treating vessel II, and in the interior of treating vessels III, IIa and Ia which will be described further below, baffle means, such as inclined metal sheets 6 of treating vessel II, 11 of treating vessel III, 18 of treating vessel IIa and 20 of treating vessel Ia, are arranged for causing the flowable material to pass downwardly through the respective treating vessel in a cascade-like fashion.

Steam derived from treated and sterilized waste water or the like by reducing the pressure thereof, is introduced into the bottom portion of treating vessel II through conduit 7. The thus-introduced steam is condensed in treating vessel II and will further dilute the sewage or the like therein, thereby also further preheating the same.

The thus twice preheated sewage or the like passes through conduit 8, pump 9 and conduit 10 into the intermediate treating vessel III in which the diluted, preheated sewage or the like is heated to at least sterilization temperature by the introduction of steam from an outside source 14 through pressure reducing valve 13 and conduit 12.

However, the live steam may also be introduced through nozzles or injectors into the preheated waste material or sewage flowing through pipe 10 which then assumes the role of the intermediate treating vessel.

In treating vessel III or pipe 10 the flowable waste material is heated to at least its sterilization temperature and the thus-heated waste liquid, sewage or the like is then maintained at substantially that temperature, i.e. at least at its sterilization temperature, in storage vessel IV which is so dimensioned that the time required for the waste liquid or the like to flow therethrough will be sufficiently long to safely complete sterilization. Storage vessel IV is formed with an interior conduit 15 and an annular outer passage 16. The heated waste liquid passes downwardly through interior conduit 15 and then upwardly through annular space 16 and is withdrawn through conduit 17. Conduit 17 is again siphon-shaped. The now sterilized and fully heated waste liquid passes through conduit 17 into vessel IIa, the first vessel of the second treating stage. In vessel IIa a pressure below atmospheric pressure, i.e., a partial vacuum, is maintained. The hot waste liquid entering vessel IIa and thereby exposed to sub-atmospheric pressure will give off steam and the thus-formed steam is passed through conduit 7 into second preheating vessel II for heating the flowable waste material passing therethrough. The sterilized waste water which has been somewhat cooled in vessel IIa passes through siphon conduit 19 into cooling vessel Ia wherein a lower residual pressure is maintained than in cooling vessel IIa. Thus, the waste water will be first cooled in vessel Ia and steam will be simultaneously formed and passed through conduit 4 into preheating vessel I.

The cooled and sterilized flowable waste material, sewage or the like is withdrawn through conduit 21 and a suitable pump from the last cooling vessel Ia so that it then may be passed under atmospheric pressure into a sewer or the like.

The partial vacuum required for steam formation in vessels IIa and Ia is produced by vacuum pump 25 which communicates through conduit 26 with first preheating vessel I. In this manner, a sub-atmospheric pressure or partial vacuum is created in preheating vessel I, and since preheating vessel I communicates through conduit 4 with the last cooling vessel Ia, pressure will also be correspondingly reduced in cooling vessel Ia. However, a small pressure differential will be established between vessel I having the lower residual pressure and vessel Ia having a somewhat higher residual pressure so that steam formed in vessel Ia will be sucked through conduit 4 into vessel I.

Vessel I communicates through conduit 5 with vessel II and thus a partial vacuum will also be established in vessel II. Vessel II communicates through conduit 7 with vessel IIa and thus a partial vacuum will also be established in vessel IIa, however, the residual presure in vessel IIa will be somewhat higher than in vessel II and in vessel II somewhat higher than in vessel I.

As described, one pump alone, namely pump 25, will produce the partial vacuum in the two pairs of treating vessels, namely vessels I and Ia on the one hand, and II and IIa on the other hand.

It is also possible to employ several vacuum pumps to achieve the above purpose, however, care must be taken that the desired pressure differentials between the siphon-connected vessels I and II on the one hand and IIa and Ia on the other hand, as well as between vessels I and Ia and II and IIa are maintained.

Generally, untreated sewage or waste waters contain various types of gases, particularly if the flowable waste material has not been subjected to any pretreatment. Such gases will be separated from the sewage or the like in the various treating vessels maintained under partial vacuum and will be withdrawn through the vacuum pump. The removal of these gases and thus also of the thermo-insulating effect of the same will facilitate heat sterilization of the flowable waste material including the solid particles thereof.

The major part of the degasification of the flowable waste material will take place in the preheating vessel I. If residual gas reaches preheating vessel II, it will be removed from the waste liquid in preheating vessel II. Conduit 27 leads from the upper portion of preheating vessel II into the lower portion of preheating vessel I for passing gas withdrawn in preheating vessel II into preheating vessel I and thus the flowable waste material leaving preheating vessel II and passing into the final heating stage will be substantially free of gas.

In the case of high gas content or formation, it is desirable to subject the flowable waste material to degasing prior to sterilization thereof, for instance in an arrangement such as shown in FIG. 2. According to FIG. 2, the untreated flowable waste material, sewage or the like passes through pump 1 and conduit 2 into degasification vessel V which communicates with a separate vacuum pump 28. Preferably, the residual pressure in vessel V is higher than in the first preheating vessel I which communicates with degasing vessel V through siphon conduit 29. The thus partially degasified flowable waste material, upon introduction into preheating vessel I, is further treated as described in connection with FIG. 1.

By way of example only, Table I below gives suitable temperatures, pressures and resting periods for the treatment of flowable waste materials, for instance sewage, in the arrangement illustrated in FIG. 1.

TABLE I

| Treating Vessel No. | I | II | III | IIa | Ia |
|---|---|---|---|---|---|
| Inlet temperature (° C.) | 25 | 56 | 84 | 110 | 84 |
| Outlet temperature (° C. approximate) | 56 | 81 | 110 | 84 | 56 |
| Pressure (mm. Hg) | 124 | 417 | 1,072 | 417 | 124 |
| Time of through-flow (minutes) | ca. 2 | 2 | 30 | 2 | 2 |

The inserts or baffles in the individual preheating vessels for directing the flow of liquid therethrough may be of greatly varying shape and design. It is the purpose of these inserts to assure a sufficiently large contact area between the steam introduced into vessels I and II and flowable waste material cascading downwardly through the same. Thus, for instance, instead of the schematically illustrated inclined baffle plates, gridlike inserts or inserts of other shape may be used.

The division of the stream of waste material in a plurality of individual streamlets which is achieved by the baffles in the respective treating vessels has a further advantage with respect to the sterilization of the material, namely that the heat supplied by the steam will be quickly and effectively conveyed to the solid particles carried by the liquid fraction of the sewage or the like, so that even the core portion of the solid particles will reach sterilization temperature. In this manner, it is possible to achieve sterilization also in the case of flowable waste materials containing a relatively high proportion of solids and the time for which the flowable waste material must be kept at sterilization temperature, and thus the dimensions of chamber IV, can be reduced due to the intimate contact with the heat supplying steam and the solid particles in the waste material.

The heat recovery is improved by increasing the number of preheating vessels and correspondingly the number of cooling vessels in which steam is liberated from the sterilized flowable waste material. Particularly when relatively large quantities of flowable waste material are to be sterilized, the somewhat larger investment in a greater number of treating vessels will be economically desirable because in such case the better heat recovery and thus the reduction in the amount of steam which is to be supplied from outside source 14 will outweigh the higher costs of the initial installation.

It is also within the scope of the present invention to arrange cooperating vessels I and Ia, or II and IIa adjacent to each other or even as integral portions of a single treating vessel, somewhat similar to the manner in which treating vessels III and IV are combined.

Due to the fact that the sterilizing arrangement according to the present invention operates without indirect heat exchange and thus without heat exchanger surfaces, encrustations, plugging up, etc. of the apparatus is practically eliminated, cleaning of treating vessels I–V is rarely required and can then be carried out by simply flushing the treating vessels with a suitable cleaning solution or water.

The maximum temperature to which the flowable waste material is to be heated will depend on the composition and on the physical characteristics of the material, such as the size of solid particles contained therein. Furthermore, there is a definite relationship between the sterilization temperature and the length of time for which the material is to be maintained at such temperature. Thus, the dimensions of treating vessel IV, i.e., the period of time for which the flowable material heated to sterilization temperature in vessel III will be maintained at such temperature has to be considered.

Generally a minimum temperature of at least between 75–80° C. is required but it is preferred to operate at higher temperatures since the higher the sterilization temperature applied, the shorter will be the period of time for which the material has to be maintained at such temperature and thus the smaller can be vessel IV.

It is also possible to provide the intermediate treating vessel III with conduits for withdrawing gas, air and vapors therefrom. For this purpose, conduit 30 is indicated in FIG. 1 which connects the upper portion of treating vessel III with steam conduit 7.

Automatic regulation or control of the sterilization arrangement can be easily effected. For this purpose, the live steam supply line for intermediate treating vessel III includes an automatically controlled steam valve 13. Steam valve 13 is operatively connected to temperature gauge 31 which is located so as to sense the temperature in temporary storage vessel IV.

Due to its simplicity, the arrangement according to the present invention permits also the sterilization of flowable waste materials which contain relatively coarse solid particles, without impeding the operation of the sterilization device. However, for working up sludges and waste waters which contain very large solid particles, it is sometimes advisable to separate such very large particles from the remainder of the flowable waste material prior to introduction of the remainder into the sterilization device of the present invention. This can be done, for instance, by passing the raw, flowable waste material through a rotating coarse-mesh revolving screen.

If the material to be treated contains very large solid particles, the period of time which the material is to be maintained at sterilization temperature must be prolonged, in order to assure that even the core portions of such relatively large particles will be properly sterilized. Therefore, in such cases it is sometimes advantageous to pass the material first through a comminuting device, for instance a suitable grinding device in which all of the very large solid particles will be sufficiently comminuted so that their sterilization throughout can be accomplished within a reasonable time. Heat requires considerably less time to penetrate completely throughout the interior of smaller particles and therefore, after such comminution of the material, complete sterilization can be achieved while maintaining the dimensions of vessel IV relatively small.

The vertically staggered relationship of the treating vessels assures a continuous flow of the flowable waste material under the given pressure relationship. If such vertically staggered arrangement and siphon-type conduits are not desired, then it will be necessary to provide pumps between the individual treating vessels, similar to pump 9 which is required for introducing the sewage or the like from preheating vessel II into final heating vessel III in which a higher pressure is maintained than in vessel II. The pressure provided by the various pumps must then be adjusted so as to give the same effect as the vertically staggered arrangement illustrated in FIG. 1. The illustrated embodiment is of greater simplicity than one in which pumps are arranged between the individual treating vessels.

The following example is given as illustrative only, without limiting the invention to the specific details described therein.

Before putting into service the installation must be evacuated by means of the vacuum pump. The example is based on the input of 30 m.$^3$/h. of sludge with 8% of solids and temperature of 25° C. This sludge is pumped to the step I. In the lower part of step I enter abt. 1.65 t./h. flash-steam from step Ia. This effects in step Ia heating up of the cold sludge from 25 to 56° C.

The sludge with 56° C. enters the upper part of step II, whilst into the lower part of step II enter abt. 1.65 t./h. flash steam from step IIa through pipe (7), which effects another heating of the sludge from 56 to 84° C.

By means of pump 9 the sludge with 84° C. enters the upper part of step III, which is fed with abt. 1.6 t./h. fresh steam through pipe 12 and effects a heating of the sludge up to the sterilization temperature of 110° C. From here the sludge goes through a center pipe to the lower part of the linger recipient IV, the contents of which is abt. 15 m.$^3$ corresponding to the example in question. The linger time is abt. 30 minutes and is sufficient to effect an absolute sterilization of the sludge.

The sterilized sludge flows from the upper part of the linger recipient IV through pipe 17 to the step IIa. In this step the sludge is cooled from 110 to 84° C. by means of the existing vacuum, whereas the flash-steam itself goes from the upper part of step IIa through pipe 7 to step I.

Then the sterilized sludge flows from step IIa to step Ia and is cooled from 84 to 56° C. by flashing under higher vacuum. The sterilized and cooled sludge leaves step Ia through pipe 21.

The high temperature of 110° C. indicated in the example in question is only necessary, when an absolute sterilization of all germs is required.

In case you require pasteurization of the sludge only, a peak temperature of abt. 75° C. is sufficient within the linger recipient. According to experience breeding of the germs contained in the sludge is then definitely interrupted. At a peak temperature of 75° C. in the linger recipient result lower temperatures within the different steps which, however, can be calculated by an expert.

It will be understood that each of the elements described above, or two or more together, may also find a useful application in other types of heat sterilization devices differing from the types described above.

While the invention has been illustrated and described as embodied in sewage sterilization device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of treating flowable waste material such as sewage and the like, comprising the steps of passing flowable waste material through a plurality of successively arranged treating stages communicating with each other and including a first group of treating stages for preheating said material, an intermediate stage for heating said material to at least the sterilization temperature thereof, and a second group of treating stages for cooling the thus sterilized material, said treating stages communicating with each other; introducing steam from an outside source into said intermediate treating stage so as to heat said flowable waste material therein to at least its sterilization temperature; creating a partial vacuum in the first one of said first group of treating stages so as to reduce the pressure in said communicating first and second treating stages, however to a progressively smaller degree in the direction from the first towards the last one of said first group of treating stages and from the last towards the first one of said second group of treating stages, whereby steam will be withdrawn and said flowable waste material will be progressively cooled in the stages of said second group of treating stages due to the reduced pressure maintained therein; introducing the thus withdrawn steam from the individual stages of said second group of treating stages into said first group of treating stages in such a manner that steam from the last stage of said second group of treating stages is introduced into the first stage of said first group of treating stages and the steam from successive stages of said second group of treating stages taken in the direction from the last towards the first stage of said second group of treating stages will be introduced into successive stages of said first group of treating stages taken in the direction from the first towards the last of said stages of said first group of treating stages thereby preheating said flowable waste material; and withdrawing the thus sterilized and cooled flowable waste material from the last of said second group of treating stages.

2. A method of treating flowable waste material such as sewage and the like, comprising the steps of passing flowable waste material through a plurality of successively arranged treating stages communicating with each other and including a first group of treating stages for preheating said material, an intermediate stage for heating said material to at least the sterilization temperature thereof, and a second group of treating stages for cooling the thus sterilized material, said treating stages communicating with each other; introducing steam from an outside source into said intermediate treating stage so as to heat said flowable waste material therein to at least its sterilization temperature; creating a partial vacuum in said second group of treating stages, whereby steam will be withdrawn and said flowable waste material will be progressively cooled in the stages of said second group of treating stages due to the reduced pressure maintained therein; introducing the thus withdrawn steam from the individual stages of said second group of treating stages into said first group of treating stages thereby preheating said flowable waste material; and withdrawing the thus sterilized and cooled flowable waste material from the last of said second group of treating stages.

3. A method of treating flowable waste material such as sewage and the like, comprising the steps of continuously passing flowable waste material through a plurality of successively arranged treating stages communicating with each other and including a first group of treating stages for preheating said material, an intermediate stage for heating said material to at least the sterilization temperature thereof, and a second group of treating stages for cooling the thus sterilized material, said treating stages communicating with each other; introducing steam from an outside source into said intermediate treating stage so as to heat said flowable waste material therein at least its sterilization temperature; creating a partial vacuum in the first one of said first group of treating stages so as to reduce the pressure in said communicating first and second treating stages, however, to a progressively smaller degree in the direction from the first towards the last one of said first group of treating stages and from the last towards the first one of said second group of treating stages, whereby steam will be withdrawn and said flowable waste material will be progressively cooled in the stages of said second group of treating stages due to the reduced pressure maintained therein; introducing the thus withdrawn steam from the individual stages of said second group of treating stages into said first group of treating stages in countercurrent flow to the flowable waste material in the respective treating stage in such a manner that steam from the last stage of said second group of treating stages is introduced into the first stage of said first group of treating stages and the steam from successive stages of said second group of treating stages taken in the direction from the last towards the first stage of said second group of treating stages will be introduced into successive stages of said first group of treating stages taken in the direction from the first towards the last of said stages of said first group of treating stages thereby preheating said flowable waste material; and withdrawing the thus-sterilized and cooled flowable waste material from the last of said second group of treating stages.

4. A method of treating flowable waste material such as sewage and the like, comprising the steps of subjecting flowable waste material to subatmospheric pressure so as to degasify the same; passing the thus degasified flowable waste material through a pluarlity of successively arranged treating stages communicating with each other and including a first group of treating stages for preheating said material, an intermediate stage for heating said material to at least the sterilization temperature thereof, and a second group of treating stages for cooling the thus sterilized material, said treating stages communicating with each other; introducing steam from an outside source into said intermediate treating stage so as to heat said flowable waste material therein to at least its sterilization temperature; creating a partial vacuum in the first one of said first group of treating stages so as to reduce the pressure in said communicating first and second treating stages, however to a progresisvely smaller degree in the direction from the first towards the last one of said first group of treating stages and from the last towards the first one of said second group of treating stages, whereby steam will be withdrawn and said flowable waste material will be progressively cooled in the stages of said second group of treating stages due to the reduced pressure maintained therein; introducing the thus withdrawn steam from the individual stages of said second group of treating stages into said first group of treating stages in such a manner that steam from the last stage of said second group of treating stages is introduced into the first stage of said first group of treating stages and the steam from successive stages of said second group of treating stages taken in the direction from the last towards the first stage of said second group of treating stages will be introduced into successive stages of said first group of treating stages taken in the direction from the first towards the last of said stages of said first group of treating stages thereby preheating said flowable waste material; and withdrawing the thus sterilized and cooled flowable waste material from the last of said second group of treating stages.

5. In an arrangement of the heat sterilization of flowable waste material such as sewage and the like, in combination, a plurality of successively arranged treating vessels communicating with each other and including a first group of treating vessels comprising at least one treating vessel, an intermediate treating vessel, and a second group comprising at least one treating vessel; means for introducing flowable waste material into the first one of said first group of treating vessels; first conduit means for passing flowable waste material through said plurality of successively arranged treating vessels in the direction from the first treating vessel of the first group of treating vessels towards the last treating vessel of the second group of treating vessels; steam introduction means for introducing steam from an outside source into said intermediate treating vessel for directly heating flowable waste material therein to at least the sterilization temperature thereof; pressure reducing means for producing a partial vacuum in said second group of treating vessels so as to form steam and to cool the flowable waste material therein; steam conduit means for passing the thus-produced steam from said treating vessels of said second group of treating vessels into said first group of treating vessels for directly preheating said flowable waste material therein; and withdrawal means for withdrawing thus-sterilized and cooled flowable waste material from the last of the treating vessels of said second group of treating vessels.

6. In an arrangement for the heat sterilization of flowable waste material such as sewage and the like, in combination, a plurality of successively arranged treating vessels communicating with each other and including a first group of treating vessels comprising at least one treating vessel, in an intermediate treating vessel, and a second group comprising at least one treating vessel; means for introducing flowable waste material into the first one of said first group of treating vessels; first conduit means for passing flowable waste material through said plurality of successively arranged treating vessels in the direction from the first treating vessel of the first group of treating vessels towards the last treating vessel of the second group of treating vessels; steam introduction means for introducing steam from an outside source into said intermediate treating vessel for directly heating flowable waste material therein to at least the sterilization temperature thereof; pressure reducing means for creating a partial vacuum in the first one of said first group of treating vessels and for reducing the pressure in said first and second group of communicating treating vessels however in a progressively smaller degree in the direction from the first one of said group of treating vessels towards the last one of said second group of treating vessels, thereby producing steam of the heated flowable waste material in said second group of treating vessels; steam conduit means for passing thus-produced steam from said treating vessels of said second group of treating vessels into said first group of treating vessels for directly preheating said flowable waste material therein; and withdrawal means for withdrawing thus-sterilized and cooled flowable waste material from the last of the treating vessels of said second group of treating vessels.

7. An arrangement as defined in claim 6, wherein said steam conduit means include means for introducing steam from the last one of said treating vessel of said second group of treating vessels into the first one of said first group of treating vessels and for introducing steam from successive ones of said second group of treating vessels taken in the direction from the last towards the first of said treating vessels of said second group of treating vessels, into successive ones of said first group of treating vessels taken in the direction from the first towards the last of said treating vessels of said first group of treating vessels.

8. In an arrangement for the heat sterilization of flowable waste material such as sewage and the like, in combination, a plurality of successively arranged treating vessels communicating with each other and including a first group of treating vessels comprising at least one treating vessel, an intermediate treating vessel, and a second group comprising at least one treating vessel said treating vessels of said first group of treating vessels and of said second group of treating vessels, respectively, being so arranged as to permit within each of said first and second groups gravity flow of flowable waste material through the respective successively arranged treating vessels; means for introducing flowable waste material into the first one of said first group of treating vessels; first conduit means for passing flowable waste material through said plurality of successively arranged treating vessels in the direction from the first treating vessel of the first group of treating vessels towards the last treating vessel of the second group of treating vessels said conduit means including pump means for pumping flowable waste material from the last treating vessel of said first group of treating vessels into said intermediate treating vessel; steam introduction means for introducing steam from an outside source into said intermediate treating vessel for directly heating flowable waste material therein to at least the sterilization temperature thereof; pressure reducing means for producing a partial vacuum in said second group of treating vessels so as to form steam and to cool the flowable waste material therein; steam conduit means for passing thus-produced steam from said treating vessels of said second group of treating vessels into said first group of treating vessels for directly preheating said flowable waste material therein; and withdrawal means for withdrawing thus sterilized and cooled flowable waste material from the last of the treating vessels of said second group of treating vessels.

9. An arrangement according to claim 5, wherein said intermediate treating vessel includes an upper portion comprising mixing means for mixing flowable waste material and steam, and a lower portion adapted to hold the thus-formed mixture consisting of heated and diluted flowable waste material for a predetermined period of time prior to passing the same through said first conduit means into the first treating vessel of said second group of treating vessels.

10. In an arrangement for the heat sterilization of flowable waste material such as sewage and the like, in combination, vacuum degassing means for degassing flowable waste material; a plurality of successively arranged treating vessels communicating with each other and including a first group of treating vessels comprising at least one treating vessel, an intermediate treating vessel, and a second group comprising at least one treating vessel; means for passing flowable waste material from said vacuum degassing means into the first one of said first group of treating vessels; first conduit means for passing flowable waste material through said plurality of successively arranged treating vessels in the direction from the first treating vessel of the first group of treating vessels towards the last treating vessel of the second group of treating vessels; steam introduction means for introducing steam from an outside source into said intermediate treating vessel for directly heating flowable waste material therein to at least the sterilization temperature thereof; pressure reducing means for producing a partial vacuum in said second group of treating vessels so as to form steam and to cool the flowable waste material therein; steam conduit means for passing thus-produced steam from said treating vessels of said second group of treating vessels into said first group of treating vessels for directly preheating said flowable waste material therein; and withdrawal means for withdrawing thus-sterilized and cooled flowable waste material from the last of the treating vessels of said second group of treating vessels.

11. In an arrangement for the heat sterilization of flowable waste material such as sewage and the like, in combination, a plurality of successively arranged treating vessels communicating with each other and including a first group of treating vessels comprising at least one treating vessel, an intermediate treating vessel, and a second group comprising at least one treating vessel at least one of said treating vessels including baffle means for deflecting flowable waste material passing therethrough; means for introducing flowable waste material into the first one of said first group of treating vessels; first conduit means for passing flowable waste material through said plurality of successively arranged treating vessels in the direction from the first treating vessel of the first group of treating vessels towards the last treating vessel of the second group of treating vessels; steam introduction means for introducing steam from an outside source into said intermediate treating vessel for directly heating flowable waste material therein to at least the sterilization temperature thereof; pressure reducing means for producing a partial vacuum in said second group of treating vessels so as to form steam and to cool the flowable waste material therein; steam conduit means for passing thus-produced steam from said treating vessels of said second group of treating vessels into said first group of treating vessels for directly preheating said flowable waste material therein; and withdrawal means for withdrawing thus-sterilized and cooled flowable waste material from the last of the treating vessels of said second group of treating vessels.

12. In an arrangment for the heat sterilization of flowable waste material such as sewage and the like, in combination, a plurality of successively arranged treating vessels communicating with each other and including a first group of treating vessels comprising at least one treating vessel, an intermediate treating vessel, and a second group comprising at least one treating vessel said treating vessels including baffle means for deflecting flowable waste material passing therethrough; means for introducing flowable waste material into the first one of said first group of treating vessels; first conduit means for passing flowable waste material through said plurality of successively arranged treating vessels in the direction from the first treating vessel of the first group of treating vessels towards the last treating vessel of the second group of treating vessels; steam introduction means for introducing steam from an outside source into said intermediate treating vessel for directly heating flowable waste material therein to at least the sterilization temperature thereof; pressure reducing means for producing a partial vacuum in said second group of treating vessels so as to form steam and to cool the flowable waste material therein; steam conduit means for passing thus-produced steam from said treating vessels of said second group of treating vessels into said first group of treating vessels for directly preheating said flowable waste material therein; and withdrawal means for withdrawing thus-sterilized and cooled flowable waste material from the last of the treating vessels of said second group of treating vessels.

References Cited by the Examiner

FOREIGN PATENTS

| | | |
|---|---|---|
| 139,931 | 1/1951 | Australia. |
| 876,846 | 9/1961 | Great Britain. |

MORRIS O. WOLK, *Primary Examiner.*